US012721470B2

(12) United States Patent
Chen

(10) Patent No.: US 12,721,470 B2
(45) Date of Patent: Sep. 1, 2026

(54) PREPARATION METHOD OF LASER TITANIUM KITCHENWARE

(71) Applicant: Guangdong Master Group Co., Ltd., Yunfu (CN)

(72) Inventor: Jian Chen, Yunfu (CN)

(73) Assignee: Guangdong Master Group Co., Ltd., Yunfu (CN)

( * ) Notice: Subject to any disclaimer, the term of this patent is extended or adjusted under 35 U.S.C. 154(b) by 0 days.

(21) Appl. No.: 19/093,302

(22) Filed: Mar. 28, 2025

(65) Prior Publication Data

US 2025/0221566 A1 Jul. 10, 2025

Related U.S. Application Data

(62) Division of application No. 18/501,011, filed on Nov. 2, 2023, now Pat. No. 12,336,657.

(30) Foreign Application Priority Data

Aug. 7, 2023 (CN) ......................... 202310984779.4

(51) Int. Cl.
*A47J 36/02* (2006.01)
*B23K 20/00* (2006.01)

(52) U.S. Cl.
CPC ........... *A47J 36/025* (2013.01); *B23K 20/002* (2013.01)

(58) Field of Classification Search
CPC ........ A47J 36/025; A47J 36/02; A47J 27/002; B23K 20/02
See application file for complete search history.

(56) References Cited

U.S. PATENT DOCUMENTS

2004/0058188 A1* 3/2004 Groll ..................... B32B 15/012 428/653
2014/0034651 A1* 2/2014 Durand ................... C09C 1/309 220/573.2

FOREIGN PATENT DOCUMENTS

CN 114158948 A * 3/2022 ............ A47J 36/025

OTHER PUBLICATIONS

CN114158948, machine translation. (Year: 2022).*

* cited by examiner

*Primary Examiner* — Robert A Vetere

(57) ABSTRACT

Disclosed is a preparation method of laser titanium kitchenware, and the laser titanium kitchenware in the present invention includes a pan body and a non-stick coating provided on an inner surface of the pan body. The non-stick coating is a nanoscale metal ceramic layer formed by extreme high-speed laser cladding and curing; or the non-stick coating is obtained by stacking a nanoscale metal ceramic layer formed by extreme high-speed laser cladding and curing and a new nano-ceramic material formed by curing; or the non-stick coating is obtained by alternately stacking a nanoscale metal ceramic layer formed by extreme high-speed laser cladding and curing and a new nano-ceramic material formed by curing for a plurality of times. The non-stick coating of the laser titanium kitchenware according to the present invention is characterized by good persistence of non-stick performance, high hardness, and good wear resistance.

9 Claims, 2 Drawing Sheets

20
10
30

PREPARATION METHOD OF LASER TITANIUM KITCHENWARE

CROSS-REFERENCE TO RELATED APPLICATION

The present application is a divisional application of U.S. patent application Ser. No. 18/501,011, filed on Nov. 2, 2023, claims priority from Chinese Patent Application No. 202310984779.4 filed on Aug. 7, 2023, the contents of which are incorporated herein by reference in their entirety.

TECHNICAL FIELD

The present invention relates to the technical field of super hard and super wear-resistant kitchenware, and in particular, to a preparation method of laser titanium kitchenware.

BACKGROUND

A surface of a non-stick pan is usually coated with a non-stick coating to achieve a non-stick function. An existing non-stick coating for cookware mainly includes a fluorine-containing coating and a ceramic coating. The fluorine-containing coating is mainly made of polytetrafluoroethylene (PTFE), perfluorooctanoic acid (PFOA), PFAS, a copolymer of fluorinated ethylene propylene (FEP), ethylene tetrafluoroethylene (ETFE), or the like. The fluorine-containing coating is non-stick because these fluoropolymers have extremely low surface free energy and low coefficients of friction. However, the fluorine-containing coating is not wear-resistant and is prone to falling off. In addition, due to low surface roughness of a pan body, the non-stick coating on the surface of the pan body is easy to be scratched and scraped off by a spatula or hard food, and consequently the non-stick coating is short in service life. As a result, the non-stick performance of the cookware slowly deteriorates, or even disappears. The ceramic coating is mainly composed of silicon-oxygen bonds and inorganic silicon to form a compact and non-porous nanostructure on the surface of a pan body, so as to achieve a non-stick effect. However, the non-stick pan body with the ceramic coating is usually made of aluminum, and a coefficient of expansion of the ceramic coating is far lower than that of aluminum. In this case, the ceramic coating easily cracks through frequent thermal expansion and contraction. Usually, fine cracks appear on the surface of the coating after 3-6 months of use. Consequently, the non-stick performance gradually deteriorates.

In conclusion, due to the used material, the current non-stick pan has problems such as poor non-stickiness, poor persistence of non-stick performance, and poor resistance to stir-frying at high temperature.

SUMMARY

The technical problems to be resolved by the present invention are poor resistance to high temperature, low hardness, poor wear resistance, and a short service life of an existing non-stick pan.

To resolve the foregoing problems, the present invention provides the following technical solutions:

The present invention provides laser titanium kitchenware, including a pan body and a non-stick coating provided on an inner surface of the pan body. The non-stick coating is a nanoscale metal ceramic layer formed by extreme high-speed laser cladding and curing; or the non-stick coating is obtained by stacking a nanoscale metal ceramic layer formed by extreme high-speed laser cladding and curing and a new nano-ceramic material formed by curing; or the non-stick coating is obtained by alternately stacking a nanoscale metal ceramic layer formed by extreme high-speed laser cladding and curing and a new nano-ceramic material formed by curing for a plurality of times.

The nanoscale metal ceramic layer includes 15-45% of titanium-coated particles and 55-85% of new nanocomposite ceramic powder material in percentage by mass.

The new nano-ceramic material includes 20-30% of polymethylsiloxane, 0.5-20% of hydroxyl silicone oil, 1-5% of low-melting-point glass powder, 6-10% of silica sol, 5-10% of silicon nitride, 5-10% of nanoscale titanium dioxide, 8-12% of nanoscale aluminum oxide, 6-8% of nanoscale titanium, 3-6% of wetting and dispersing additive, 2-4% of thickener, and 10-15% of water in percentage by mass.

The new nanocomposite ceramic powder material is at least one of titanium nitride (TiN), titanium carbide (TiC), silicon carbide (SiC), titanium carbonitride (TiCN), titanium boride (TiB), aluminum oxide ($Al_2O_3$), lanthanum oxide ($La_2O_3$), yttrium oxide ($Y_2O_3$), zirconium oxide (ZrO), magnesium oxide (MgO), hydroxyapatite ($Ca_{10}(PO_4)_6(OH)_2$), and iron powder (Fe).

The titanium-coated particle is of a core-shell structure with three layers, an outer shell layer is a titanium metal, an inner core layer is silicone oil, a resin layer is between the outer shell layer and the inner core layer, and the resin layer is a mixture of polymethylsiloxane and iron powder. In percentage by mass, the titanium metal is 10-40%, polymethylsiloxane is 55-70%, the iron powder is 0.5-2%, and the balance is the silicone oil.

$SiO_2$ in the silica sol is 1-50% in percentage by mass and has an average particle size range of 1-500 nm.

In a further technical solution, in the titanium-coated particle, the titanium metal is nanoscale titanium powder, and the iron powder is nanoscale. Specifically, the titanium-coated particles may be prepared by using the following steps:

1. The nanoscale iron powder is added into polymethylsiloxane and dispersed uniformly, to obtain a resin solution.
2. The resin solution and the silicone oil are subjected to miniemulsion polymerization to obtain resin particles with a smooth surface and uniform particle size distribution, in which the silicone oil is coated with the resin.
3. The resin particles are atomized into the nanoscale titanium metal, so that the nanoscale titanium metal is uniformly attached to the surfaces of the resin particles, achieving an effect of fully coating the resin particles with the titanium metal, to obtain the titanium-coated particles.

It is to be noted that the silicone oil is non-stick but has poor heat resistance. The silicone oil is coated with the resin containing the iron powder and then coated with the titanium metal to obtain the titanium-coated particles. Through extreme high-speed laser cladding and curing at high temperature, the titanium metal absorbs heat and melts, which can protect the resin and the silicone oil, so that the resin and the silicone oil are stored in the coating. When the kitchenware including the nanoscale metal ceramic layer containing the titanium-coated particles is heated, the resin expands, and the silicone oil seeps out through pores of the resin, which improves a non-stick effect of the nanoscale metal ceramic layer. Moreover, the addition of the iron powder helps improve heat resistance of the resin layer.

It should be noted that the addition of the titanium-coated particles in the nanoscale metal ceramic layer helps improve non-stickiness of the coating, appropriately in 15-45%, preferably in 20-35%. If the content of the titanium-coated particles is excessively low, the nanoscale metal ceramic layer has a poor non-stick effect. If the content of the titanium-coated particle is excessively high, a bonding effect between the nanoscale metal ceramic layer and the new nano-ceramic material is affected.

In a further technical solution, a side that is of the non-stick coating and that is away from the pan body is the new nano-ceramic material, and a side that is of the non-stick coating and that is attached to the pan body is the nanoscale metal ceramic layer.

It is to be noted that in the new nano-ceramic material, the wetting and dispersing additive may be TEGO sodium tripolyphosphate, and the thickener may be a swellable emulsion (HASE) thickener, which may be selected by a person skilled in the art based on technical knowledge. This is not limited in the present invention.

In a further technical solution, the new nanocomposite ceramic powder material is at least three or six of titanium nitride (TiN), titanium carbide (TIC), silicon carbide (SiC), titanium carbonitride (TiCN), titanium boride (TiB), aluminum oxide ($Al_2O_3$), lanthanum oxide ($La_2O_3$), yttrium oxide ($Y_2O_3$), zirconium oxide (ZrO), magnesium oxide (MgO), hydroxyapatite ($Ca_{10}(PO_4)_6(OH)_2$), and iron powder (Fe), to obtain the nanoscale metal ceramic layer of high hardness.

In a further technical solution, a particle size of the new nanocomposite ceramic powder material is 0.01-6 μm, and a particle size of the titanium-coated particle is 2-6 μm.

In a further technical solution, a thickness of the non-stick coating is 30-1000 μm. For example, the thickness of the non-stick coating is 30 μm, 80 μm, 100 μm, 200 μm, 500 μm, 800 μm, or 1000 μm.

In a further technical solution, a thickness of the nanoscale metal ceramic layer is 5-20 μm. For example, the thickness of the nanoscale metal ceramic layer is 5 μm, 8 μm, 10 μm, 12 μm, 15 μm, 18 μm, or 20 μm.

It is to be noted that the nanoscale metal ceramic layer is characterized by high hardness and low toughness. A pan bottom needs to be shaped in the process of forming the kitchenware. If the thickness of a single nanoscale metal ceramic layer is excessively large, the nanoscale metal ceramic layer cracks due to low toughness, leading to a quality problem. Therefore, the thickness of a single nanoscale metal ceramic layer should not be excessively large, appropriately 5-20 μm. This thickness range can avoid microcracks on the coating when the pan bottom is shaped.

In a further technical solution, a thickness of the new nano-ceramic material is 1-8 μm. For example, the thickness of the new nano-ceramic material is 1 μm, 2 μm, 5 μm, or 8 μm.

In a further technical solution, a superconducting magnetic layer of a thickness of 300-600 μm is provided on an outer surface of the pan body. For example, the thickness of the superconducting magnetic layer is 300 μm, 400 μm, 500 μm, or 600 μm. Specifically, the superconducting magnetic layer is provided at the bottom of the outer surface of the pan body.

In a further technical solution, the superconducting magnetic layer includes the following components in percentage by mass:

80-92% of nickel-iron alloy, 0.03-2.5% of carbon powder, 2-6% of graphene, 1-3.5% of chromium powder, 4-6% of molybdenum powder, and 0.5-3% of copper powder, where the nickel-iron alloy contains 65-79% of nickel.

In a further technical solution, the pan body is made of any one of aluminum, iron, stainless steel, copper, titanium, and ceramic.

The present invention further provides a method for preparing the laser titanium kitchenware according to the first aspect, including the following steps:

sandblasting a clean pan body; and preparing a non-stick coating on an inner surface of the pan body;

a method for preparing the non-stick coating includes: heating the pan body to 120-180° C., performing extreme high-speed laser cladding and curing on a powder material of the nanoscale metal ceramic layer to obtain the nanoscale metal ceramic layer of a preset thickness, and performing high-temperature melting and curing at 293-1693° C. to obtain the non-stick coating; or a method for preparing the non-stick coating includes: heating the pan body to 120-180° C., performing extreme high-speed laser cladding and curing on a powder material of the nanoscale metal ceramic layer to obtain the nanoscale metal ceramic layer, curing a coating of the new nano-ceramic material on the nanoscale metal ceramic layer to obtain the new nano-ceramic material, and performing high-temperature melting and curing at 293-1693° C. to obtain the non-stick coating of a preset thickness; or a method for preparing the non-stick coating includes: S2: heating the pan body to 120-180° C., and performing extreme high-speed laser cladding and curing on a powder material of the nanoscale metal ceramic layer to obtain the nanoscale metal ceramic layer; S3: curing a coating of the new nano-ceramic material on the nanoscale metal ceramic layer to obtain the new nano-ceramic material; and repeating steps S2 and S3 until a preset thickness is obtained, and performing high-temperature melting and curing at 293-1693° C. to obtain the non-stick coating.

Specifically, the operation of performing extreme high-speed laser cladding and curing on the nanoscale metal ceramic layer includes the following steps. After the pan body is heated to 120-180° C., laser heat curing is performed on the powder material of the nanoscale metal ceramic layer on the inner surface of the dry and clean pan body. The process parameters of the curing include power of 1.5-2 kW, a scanning speed of 8-12 mm/s, a spot diameter of 3 mm, an argon flow rate of 20-30 L/min, and a powder feed rate of 8 g/min. The laser-heat-cured coating is obtained on the inner surface of the pan body through natural cooling for 15-20 s. Then, the surface of the laser-heat-cured coating is purged with an argon gas under a pressure of 1-2 MPa to be clean, and is then subjected to extreme high-speed laser remelting, to obtain the nanoscale metal ceramic layer. The process parameters of the extreme high-speed laser remelting include power of 100-250 W, a scanning speed of 10-12 mm/s, a spot diameter of 4-6 mm, and an argon flow rate of 20-30 L/min.

Specifically, the operation of curing the coating of new nano-ceramic material on the nanoscale metal ceramic layer to obtain the new nano-ceramic material includes the following steps. The nanoscale metal ceramic layer obtained by the extreme high-speed laser remelting is purged with an argon gas under a pressure of 1.0-2.0 MPa for 20-30 s to be clean, and is then coated with the coating of the new nano-ceramic material, with a distance between a spray gun and the surface of the pan body controlled to be 15-30 cm, to ensure that the coating of the new nano-ceramic material covers the entire nanoscale metal ceramic layer. The coating of the new nano-ceramic material is cured with the help of excess heat from the extreme high-speed laser remelting process, to obtain the new nano-ceramic material.

Specifically, in the solution of obtaining the non-stick coating by alternately stacking the nanoscale metal ceramic layer formed by extreme high-speed laser cladding and curing and the new nano-ceramic material formed by curing for a plurality of times, using steps S2 and S3 as one cycle, the nanoscale metal ceramic layer and the new nano-ceramic material are alternately formed on the inner surface of the pan body through 2-50 cycles, to obtain a preset thickness. In this case, the non-stick coating is obtained. During actual implementation, in each cycle, the time interval between the laser heat curing and the extreme high-speed laser remelting that are in step S2 is 10-20 s, and the time interval between the extreme high-speed laser remelting and the curing in step S3 is 20-30 s. The time interval between adjacent cycles is 30-50 s. In this way, processing efficiency can be greatly improved without compromising process quality.

It is to be noted that in the preparation method, high-temperature melting and curing is to further cure and bond the non-stick coating and the pan body, to improve the bonding between the non-stick coating and the pan body. The temperature depends on the material of the pan body. For example, if the pan body is made of stainless steel, the temperature for high-temperature melting and curing is 1100-1300° C.; or if the pan body is made of aluminum, the temperature for high-temperature melting and curing is 293-500° C.

It may be understood that in the preparation method in the present invention, thermal energy for preparing the non-stick coating is an extreme high-speed laser. However, the protection scope of the present invention is not limited to the preparation process with the laser energy, but also includes preparation processes with heat sources such as laser-produced plasma, plasma, and electron beams.

In a further technical solution, the preparation method further includes performing extreme high-speed laser cladding and curing on a superconducting magnetic layer on an outer surface of the pan body.

Specifically, laser heat curing is performed on the powder material of the superconducting magnetic layer on the outer surface of the pan body. The process parameters of the curing include power of 1.5-2 kW, a scanning speed of 8-12 mm/s, a spot diameter of 3 mm, an argon flow rate of 20-30 L/min, and a powder feed rate of 8 g/min. The laser-heat-cured coating is obtained on the outer surface of the pan body through natural cooling for 15-20 s. Then, the surface of the laser-heat-cured coating is purged with an argon gas under a pressure of 1-2 MPa to be clean, and is then subjected to extreme high-speed laser remelting, to obtain the superconducting magnetic layer. The process parameters of the extreme high-speed laser remelting include power of 100-250 W, a scanning speed of 10-12 mm/s, a spot diameter of 4-6 mm, and an argon flow rate of 20-30 L/min.

In another implementation, the overall process for preparing the laser titanium kitchenware includes: 1: stretch forming on round sheet, 2: edge turning, 3: washing, 4: sandblasting, 5: preparation of non-stick coating, 6: internal polishing, 7: external sanding, 8: extreme high-speed laser cladding and curing on superconducting magnetic layer according to the implementation process and implementation parameters in step S5, 9: sanding, 10: curing, 11: assembly, and 12: packaging.

It is to be noted that the laser titanium kitchenware provided in the present invention includes all tableware and kitchenware.

Preferably, the non-stick coating in the present invention is obtained by alternately stacking the nanoscale metal ceramic layer formed by extreme high-speed laser cladding and curing and the new nano-ceramic material formed by curing for a plurality of times.

Compared with the related art, the present invention includes the following technical effects:

Laser titanium kitchenware provided in the present invention includes a pan body and a non-stick coating provided on an inner surface of the pan body. The non-stick coating is a nanoscale metal ceramic layer formed by extreme high-speed laser cladding and curing; or the non-stick coating is obtained by stacking a nanoscale metal ceramic layer formed by extreme high-speed laser cladding and curing and a new nano-ceramic material formed by curing; or the non-stick coating is obtained by alternately stacking a nanoscale metal ceramic layer formed by extreme high-speed laser cladding and curing and a new nano-ceramic material formed by curing for a plurality of times. The nanoscale metal ceramic layer contains titanium-coated particles with resin and silicone oil inside, and a new nano-composite ceramic powder material. Through extreme high-speed laser cladding and curing, the resin and the silicone oil inside the titanium-coated particles can be effectively stored in the coating, so that the nanoscale metal ceramic layer has high hardness and good non-stickiness. The new nano-ceramic material is composed of polymethylsiloxane, hydroxyl silicone oil, low-melting-point glass powder, silica sol, silicon nitride, nanoscale titanium dioxide, nanoscale aluminum oxide, and nanoscale titanium, and is formed on the surface of the nanoscale metal ceramic layer by using a curing process, so that the new nano-ceramic material also has high hardness and good non-stickiness. In a preferred solution, the nanoscale metal ceramic layer and the new nano-ceramic material are alternately stacked. In this case, an effect of high hardness, good wear resistance, and good persistence of non-stick performance of the non-stick coating can be achieved.

In addition, when the laser titanium kitchenware in the present invention is manufactured, the nanoscale metal ceramic layer is first formed by extreme high-speed laser cladding and curing, and the new nano-ceramic material is cured on the surface of the nanoscale metal ceramic layer with the help of excess heat from laser cladding. In this case, an adhesion effect of the new nano-ceramic material is better, and the bonding between the nanoscale metal ceramic layer and the new nano-ceramic material is improved. Moreover, the composition of the nanoscale metal ceramic layer is similar to that of the new nano-ceramic material, which helps the bonding between the nanoscale metal ceramic layer and the new nano-ceramic material. In a preferred solution, the non-stick coating is obtained by alternately stacking the nanoscale metal ceramic layer and the new nano-ceramic material for a plurality of times. Both the nanoscale metal ceramic layer and the new nano-ceramic material have high hardness and good non-stickiness, and have strong bonding therebetween, so the non-stick coating achieves an effect of high hardness, good wear resistance, and good persistence of non-stick performance.

BRIEF DESCRIPTION OF THE DRAWINGS

To describe the technical solutions in examples of the present invention more clearly, the accompanying drawings to be used in the description of the examples will be briefly described below. Clearly, the accompanying drawings in the following description are some examples of the present invention, and a person of ordinary skill in the art may further obtain other drawings based on these accompanying drawings without creative efforts.

REFERENCE NUMERALS OF THE DRAWINGS

Figures 1, 2:
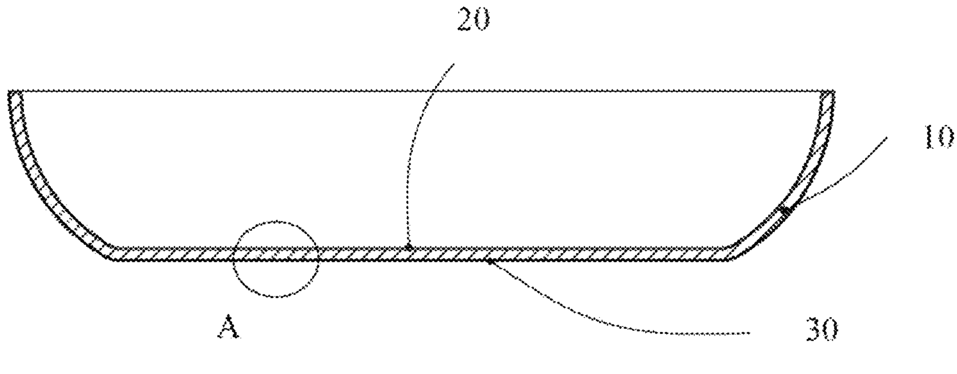
FIG. 1 is a schematic diagram of a structure of laser titanium kitchenware according to Example 1 of the present invention.
FIG. 2 is a partial enlarged view at A in FIG. 1.

Pan body 10, non-stick coating 20, superconducting magnetic layer 30, nanoscale metal ceramic layer 21, new nano-ceramic material 22, outer shell layer 41, resin layer 42, and inner core layer 43.

DETAILED DESCRIPTION

The following describes the technical solutions in the examples clearly and completely with reference to the accompanying drawings in the examples of the present invention. Similar component reference numerals in the accompanying drawings represent similar components. It is clear that the described examples below are merely some rather than all of the examples of the present invention. All other examples obtained by a person of ordinary skill in the art based on the examples of the present invention without creative efforts shall fall within the protection scope of the present invention.

It should be understood that, when used in this specification and the appended claims, the terms "including" and "comprising" indicate the existence of the features, wholes, steps, operations, elements, and/or components described, but do not exclude the existence or addition of one or more other features, wholes, steps, operations, elements, components, and/or collections thereof.

It should also be understood that the terms used in this specification and the examples of the present invention are only for describing specific examples, but are not intended to limit the examples of the present invention. As used in the description of this specification, the examples of the present invention, and the appended claims, the singular forms "a", "an", and "the" are intended to include the plural forms, unless the context clearly indicates otherwise.

Example 1

Figure 3:
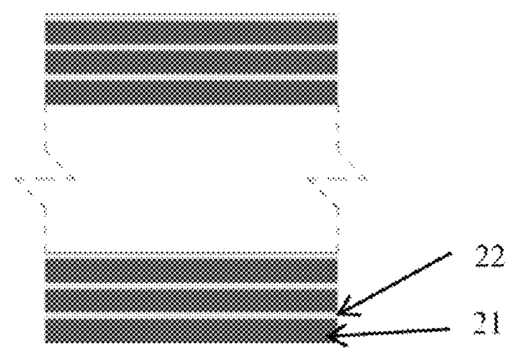
FIG. 3 is a schematic diagram of a structure of a non-stick coating of laser titanium kitchenware according to an example of the present invention.

Referring to FIG. 1 to FIG. 3, this example of the present invention provides laser titanium kitchenware. It can be learned from the figures that the laser titanium kitchenware includes a pan body 10, a non-stick coating 20 provided on an inner surface of the pan body, and a superconducting magnetic layer 30 provided on an outer surface of the pan body. The non-stick coating 20 is obtained by alternately stacking a nanoscale metal ceramic layer 21 formed by extreme high-speed laser cladding and curing and a new nano-ceramic material 22 formed by curing for a plurality of times. A side that is of the non-stick coating 20 and that is away from the pan body 10 is the new nano-ceramic material 22, and a side that is of the non-stick coating 20 and that is attached to the pan body 10 is the nanoscale metal ceramic layer 21.

The nanoscale metal ceramic layer includes 30% of titanium-coated particles and 70% of new nanocomposite ceramic powder material in percentage by mass. The new nanocomposite ceramic powder material is TiN, TiC, SiC, TiCN, TiB, $Al_2O_3$, $La_2O_3$, $Y_2O_3$, ZrO, MgO, $Ca_{10}(PO_4)_6(OH)_2$, and Fe.

The new nano-ceramic material includes 25% of polymethylsiloxane, 10% of hydroxyl silicone oil, 3% of low-melting-point glass powder, 10% of silica sol, 7% of silicon nitride, 10% of nanoscale titanium dioxide, 10% of nanoscale aluminum oxide, 7% of nanoscale titanium, 3% of wetting and dispersing additive, 3% of thickener, and 12% of water in percentage by mass.

Figure 4:
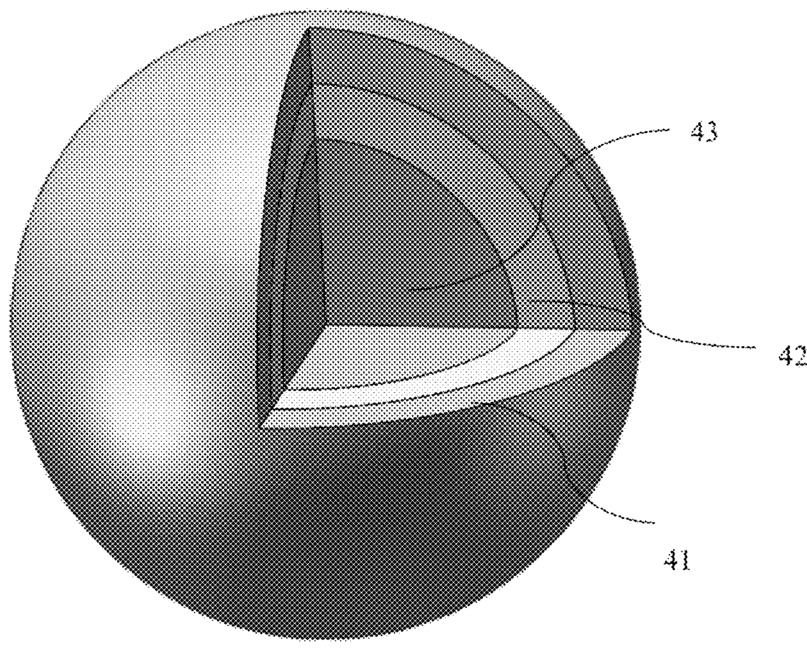
FIG. 4 is a schematic diagram of a structure of a titanium-coated particle according to the present invention.

Referring to FIG. 4, the titanium-coated particle is of a core-shell structure with three layers, an outer shell layer 41 is a titanium metal, an inner core layer 43 is silicone oil, a resin layer 42 is between the outer shell layer 41 and the inner core layer 43, and the resin layer 42 is a mixture of polymethylsiloxane and iron powder. In percentage by mass, the titanium metal is 30%, polymethylsiloxane is 58%, the iron powder is 2%, and the balance is the silicone oil.

In this example, in the titanium-coated particle, the titanium metal is nanoscale titanium powder, and the iron powder is nanoscale. Specifically, the titanium-coated particles may be prepared by using the following steps:

1. The nanoscale iron powder was added into polymethylsiloxane and dispersed uniformly, to obtain a resin solution.
2. The resin solution and the silicone oil were subjected to miniemulsion polymerization to obtain resin particles with a smooth surface and uniform particle size distribution, in which the silicone oil was coated with the resin.
3. The resin particles were atomized into the nanoscale titanium metal, so that the nanoscale titanium metal was uniformly attached to the surfaces of the resin particles, achieving an effect of fully coating the resin particles with the titanium metal, to obtain the titanium-coated particles.

In this example, a thickness of the superconducting magnetic layer is 500 μm, and the superconducting magnetic layer includes the following components in percentage by mass:

85% of nickel-iron alloy, 1.8% of carbon powder, 4% of graphene, 2.2% of chromium powder, 5% of molybdenum powder, and 2% of copper powder, where the nickel-iron alloy contains 70% of nickel. A particle size of the foregoing powder is 0.01-6 μm.

In this example, a particle size of the new nanocomposite ceramic powder material is 0.01-6 μm, and a particle size of the titanium-coated particle is 2-6 μm.

In this example, a thickness of the non-stick coating is 300 μm. The nanoscale metal ceramic layer of a thickness of 10 μm and the new nano-ceramic material of a thickness of 5 μm are alternately stacked for 20 times.

In this example, the pan body is made of stainless steel.

This example of the present invention further provides a method for preparing the foregoing laser titanium kitchenware, including the following steps:

S1: A clean pan body was sandblasted.

S2: The pan body was heated to 120-180° C., and extreme high-speed laser cladding and curing were performed on the nanoscale metal ceramic layer.

S3: The nanoscale metal ceramic layer was coated with the new nano-ceramic material.

S4: Steps S2 and S3 were repeated until a preset thickness was obtained, and high-temperature melting and curing were performed at 1200° C. to obtain the non-stick coating.

S5: Extreme high-speed laser cladding and curing were performed on the superconducting magnetic layer on an outer surface of the pan body.

Specifically, in step S2 of this example, after the pan body was heated to 180° C., laser heat curing was performed on the powder material of the nanoscale metal ceramic layer on the inner surface of the dry and clean pan body. The process parameters of the curing include power of 1.8 KW, a scanning speed of 10 mm/s, a spot diameter of 3 mm, an argon flow rate of 25 L/min, and a powder feed rate of 8 g/min. The laser-heat-cured coating was obtained on the inner surface of the pan body through natural cooling for 15 s. Then, the surface of the laser-heat-cured coating was purged with an argon gas under a pressure of 1.3 MPa to be clean, and was then subjected to extreme high-speed laser remelting, to obtain the nanoscale metal ceramic layer. The process parameters of the extreme high-speed laser remelting include power of 250 W, a scanning speed of 12 mm/s, a spot diameter of 5 mm, and an argon flow rate of 28 L/min.

Specifically, in step S3, the nanoscale metal ceramic layer obtained by the extreme high-speed laser remelting was purged with an argon gas under a pressure of 1.0 MPa for 20 s to be clean, and was then coated with the coating of the new nano-ceramic material, with a distance between a spray gun and the surface of the pan body controlled to be 15 cm, to ensure that the coating of the new nano-ceramic material covered the entire nanoscale metal ceramic layer. The coating of the new nano-ceramic material was cured with the help of excess heat from the extreme high-speed laser remelting process, to obtain the new nano-ceramic material.

Specifically, in step S5, laser heat curing was performed on the powder material of the superconducting magnetic layer on the outer surface of the pan body. The process parameters of the curing include power of 1.5 kW, a scanning speed of 8 mm/s, a spot diameter of 3 mm, an argon flow rate of 25 L/min, and a powder feed rate of 8 g/min. The laser-heat-cured coating was obtained on the outer surface of the pan body through natural cooling for 15 s. Then, the surface of the laser-heat-cured coating was purged with an argon gas under a pressure of 1-2 MPa to be clean, and was then subjected to extreme high-speed laser remelting, to obtain the superconducting magnetic layer. The process parameters of the extreme high-speed laser remelting include power of 250 W, a scanning speed of 12 mm/s, a spot diameter of 4 mm, and an argon flow rate of 20 L/min.

In another implementation, the overall process for preparing the laser titanium kitchenware includes: 1: stretch forming on round sheet, 2: edge turning, 3: washing, 4: sandblasting, 5: performing steps S2 to S4 according to the implementation processes and parameters, 6: internal polishing, 7: external sanding, 8: extreme high-speed laser cladding and curing on superconducting magnetic layer according to the implementation process and implementation parameters in step S5, 9: sanding, 10: curing, 11: assembly, and 12: packaging.

Example 2

This example of the present invention provides laser titanium kitchenware, including a pan body, a non-stick coating provided on an inner surface of the pan body, and a superconducting magnetic layer provided on an outer surface of the pan body. The non-stick coating is obtained by alternately stacking a nanoscale metal ceramic layer formed by extreme high-speed laser cladding and curing and a new nano-ceramic material formed by curing for a plurality of times. A side that is of the non-stick coating and that is away from the pan body is the new nano-ceramic material, and a side that is of the non-stick coating and that is attached to the pan body is the nanoscale metal ceramic layer.

The nanoscale metal ceramic layer includes 25% of titanium-coated particles and 75% of new nanocomposite ceramic powder material in percentage by mass. The new nanocomposite ceramic powder material is TiN, TiC, SiC, TiCN, TiB, $Al_2O_3$, $La_2O_3$, $Y_2O_3$, ZrO, MgO, $Ca_{10}(PO_4)_6(OH)_2$, and Fe.

The new nano-ceramic material includes 25% of polymethylsiloxane, 10% of hydroxyl silicone oil, 3% of low-melting-point glass powder, 10% of silica sol, 7% of silicon nitride, 10% of nanoscale titanium dioxide, 10% of nanoscale aluminum oxide, 7% of nanoscale titanium, 3% of wetting and dispersing additive, 3% of thickener, and 12% of water in percentage by mass.

The titanium-coated particle is of a core-shell structure with three layers, an outer shell layer is a titanium metal, an inner core layer is silicone oil, a resin layer is between the outer shell layer and the inner core layer, and the resin layer is a mixture of polymethylsiloxane and iron powder. In percentage by mass, the titanium metal is 30%, polymethylsiloxane is 58%, the iron powder is 2%, and the balance is the silicone oil.

In this example, in the titanium-coated particle, the titanium metal is nanoscale titanium powder, and the iron powder is nanoscale. Specifically, the titanium-coated particles may be prepared by using the following steps:

1. The nanoscale iron powder was added into polymethylsiloxane and dispersed uniformly, to obtain a resin solution.
2. Miniemulsion polymerization was performed to obtain resin particles with a smooth surface and uniform particle size distribution, in which the silicone oil was coated with the resin.
3. The resin particles were atomized into the nanoscale titanium metal, so that the nanoscale titanium metal was uniformly attached to the surfaces of the resin particles, achieving an effect of fully coating the resin particles with the titanium metal, to obtain the titanium-coated particles.

In this example, a thickness of the superconducting magnetic layer is 450 μm, and the superconducting magnetic layer includes the following components in percentage by mass:

85% of nickel-iron alloy, 1.8% of carbon powder, 4% of graphene, 2.2% of chromium powder, 5% of molybdenum powder, and 2% of copper powder, where the nickel-iron alloy contains 70% of nickel.

In this example, a particle size of the new nanocomposite ceramic powder material is 0.01-6 μm, and a particle size of the titanium-coated particle is 2-6 μm.

In this example, a thickness of the non-stick coating is 300 μm. The nanoscale metal ceramic layer of a thickness of 8 μm and the new nano-ceramic material of a thickness of 7 μm are alternately stacked for 20 times.

In this example, the pan body is made of stainless steel.

This example of the present invention further provides a method for preparing the foregoing laser titanium kitchenware, including the following steps:

S1: A clean pan body was sandblasted.

S2: The pan body was heated to 120-180° C., and extreme high-speed laser cladding and curing were performed on the nanoscale metal ceramic layer.

S3: The nanoscale metal ceramic layer was coated with the new nano-ceramic material.

S4: Steps S2 and S3 were repeated until a preset thickness was obtained, and high-temperature melting and curing were performed at 1200° C. to obtain the non-stick coating.

S5: Extreme high-speed laser cladding and curing were performed on the superconducting magnetic layer on an outer surface of the pan body.

Specifically, in step S2 of this example, after the pan body was heated to 150° C., laser heat curing was performed on the powder material of the nanoscale metal ceramic layer on the inner surface of the dry and clean pan body. The process parameters of the curing include power of 2.0 KW, a scanning speed of 11 mm/s, a spot diameter of 3 mm, an argon flow rate of 25 L/min, and a powder feed rate of 8 g/min. The laser-heat-cured coating was obtained on the inner surface of the pan body through natural cooling for 15 s. Then, the surface of the laser-heat-cured coating was purged with an argon gas under a pressure of 1.3 MPa to be clean, and was then subjected to extreme high-speed laser remelting, to obtain the nanoscale metal ceramic layer. The process parameters of the extreme high-speed laser remelting include power of 250 W, a scanning speed of 12 mm/s, a spot diameter of 5 mm, and an argon flow rate of 28 L/min.

Specifically, in step S3, the nanoscale metal ceramic layer obtained by the extreme high-speed laser remelting was purged with an argon gas under a pressure of 1.0 MPa for 20 s to be clean, and was then coated with the coating of the new nano-ceramic material, with a distance between a spray gun and the surface of the pan body controlled to be 15 cm, to ensure that the coating of the new nano-ceramic material covered the entire nanoscale metal ceramic layer. The coating of the new nano-ceramic material was cured with the help of excess heat from the extreme high-speed laser remelting process, to obtain the new nano-ceramic material.

Specifically, in step S5, laser heat curing was performed on the powder material of the superconducting magnetic layer on the outer surface of the pan body. The process parameters of the curing include power of 1.8 kW, a scanning speed of 8 mm/s, a spot diameter of 3 mm, an argon flow rate of 25 L/min, and a powder feed rate of 8 g/min. The laser-heat-cured coating was obtained on the outer surface of the pan body through natural cooling for 15 s. Then, the surface of the laser-heat-cured coating was purged with an argon gas under a pressure of 1-2 MPa to be clean, and was then subjected to extreme high-speed laser remelting, to obtain the superconducting magnetic layer. The process parameters of the extreme high-speed laser remelting include power of 250 W, a scanning speed of 11 mm/s, a spot diameter of 4 mm, and an argon flow rate of 20 L/min.

In another implementation, the overall process for preparing the laser titanium kitchenware includes: 1: stretch forming on round sheet, 2: edge turning, 3: washing, 4: sandblasting, 5: performing steps S2 to S4 according to the implementation processes and parameters, 6: internal polishing, 7: external sanding, 8: extreme high-speed laser cladding and curing on superconducting magnetic layer according to the implementation process and implementation parameters in step S5, 9: sanding, 10: curing, 11: assembly, and 12: packaging.

Example 3

This example of the present invention provides laser titanium kitchenware and a preparation method thereof. The laser titanium kitchenware includes a pan body, a non-stick coating provided on an inner surface of the pan body, and a superconducting magnetic layer provided on an outer surface of the pan body. The non-stick coating is obtained by alternately stacking a nanoscale metal ceramic layer formed by extreme high-speed laser cladding and curing and a new nano-ceramic material formed by curing for a plurality of times. A side that is of the non-stick coating and that is away from the pan body is the new nano-ceramic material, and a side that is of the non-stick coating and that is attached to the pan body is the nanoscale metal ceramic layer.

The nanoscale metal ceramic layer includes 20% of titanium-coated particles and 80% of new nanocomposite ceramic powder material in percentage by mass. The new nanocomposite ceramic powder material is TiN, TIC, SiC, TiCN, TiB, $Al_2O_3$, $La_2O_3$, $Y_2O_3$, ZrO, MgO, $Ca_{10}(PO_4)_6(OH)_2$, and Fe.

The new nano-ceramic material includes 25% of polymethylsiloxane, 10% of hydroxyl silicone oil, 3% of low-melting-point glass powder, 10% of silica sol, 7% of silicon nitride, 10% of nanoscale titanium dioxide, 10% of nanoscale aluminum oxide, 7% of nanoscale titanium, 3% of wetting and dispersing additive, 3% of thickener, and 12% of water in percentage by mass.

The titanium-coated particle is of a core-shell structure with three layers, an outer shell layer is a titanium metal, an inner core layer is silicone oil, a resin layer is between the outer shell layer and the inner core layer, and the resin layer is a mixture of polymethylsiloxane and iron powder. In percentage by mass, the titanium metal is 30%, polymethylsiloxane is 58%, the iron powder is 2%, and the balance is the silicone oil.

In this example, in the titanium-coated particle, the titanium metal is nanoscale titanium powder, and the iron powder is nanoscale. Specifically, the titanium-coated particles may be prepared by using the following steps:

1. The nanoscale iron powder was added into polymethylsiloxane and dispersed uniformly, to obtain a resin solution.
2. Miniemulsion polymerization was performed to obtain resin particles with a smooth surface and uniform particle size distribution, in which the silicone oil was coated with the resin.
3. The resin particles were atomized into the nanoscale titanium metal, so that the nanoscale titanium metal was uniformly attached to the surfaces of the resin particles, achieving an effect of fully coating the resin particles with the titanium metal, to obtain the titanium-coated particles.

In this example, a thickness of the superconducting magnetic layer is 400 μm, and the superconducting magnetic layer includes the following components in percentage by mass:

85% of nickel-iron alloy, 1.8% of carbon powder, 4% of graphene, 2.2% of chromium powder, 5% of molybdenum powder, and 2% of copper powder, where the nickel-iron alloy contains 70% of nickel.

In this example, a particle size of the new nanocomposite ceramic powder material is 0.01-6 μm, and a particle size of the titanium-coated particle is 2-6 μm.

In this example, a thickness of the non-stick coating is 150 μm. The nanoscale metal ceramic layer of a thickness of 12 μm and the new nano-ceramic material of a thickness of 3 μm are alternately stacked for 10 times.

In this example, the pan body is made of aluminum.

This example of the present invention further provides a method for preparing the foregoing laser titanium kitchenware, including the following steps:

S1: A clean pan body was sandblasted.

S2: The pan body was heated to 120-180° C., and extreme high-speed laser cladding and curing were performed on the nanoscale metal ceramic layer.

S3: The nanoscale metal ceramic layer was coated with the new nano-ceramic material.

S4: Steps S2 and S3 were repeated until a preset thickness was obtained, and high-temperature melting and curing were performed at 450° C. to obtain the non-stick coating.

S5: Extreme high-speed laser cladding and curing were performed on the superconducting magnetic layer on an outer surface of the pan body.

Specifically, in step S2 of this example, after the pan body was heated to 160° C., laser heat curing was performed on the powder material of the nanoscale metal ceramic layer on the inner surface of the dry and clean pan body. The process parameters of the curing include power of 2.0 kW, a scanning speed of 10 mm/s, a spot diameter of 3 mm, an argon flow rate of 25 L/min, and a powder feed rate of 8 g/min. The laser-heat-cured coating was obtained on the inner surface of the pan body through natural cooling for 15 s. Then, the surface of the laser-heat-cured coating was purged with an argon gas under a pressure of 1.5 MPa to be clean, and was then subjected to extreme high-speed laser remelting, to obtain the nanoscale metal ceramic layer. The process parameters of the extreme high-speed laser remelting include power of 200 W, a scanning speed of 12 mm/s, a spot diameter of 5 mm, and an argon flow rate of 28 L/min.

Specifically, in step S3, the nanoscale metal ceramic layer obtained by the extreme high-speed laser remelting was purged with an argon gas under a pressure of 1.0 MPa for 20 s to be clean, and was then coated with the coating of the new nano-ceramic material, with a distance between a spray gun and the surface of the pan body controlled to be 15 cm, to ensure that the coating of the new nano-ceramic material covered the entire nanoscale metal ceramic layer. The coating of the new nano-ceramic material was cured with the help of excess heat from the extreme high-speed laser remelting process, to obtain the new nano-ceramic material.

Specifically, in step S5, laser heat curing was performed on the powder material of the superconducting magnetic layer on the outer surface of the pan body. The process parameters of the curing include power of 1.5 kW, a scanning speed of 8 mm/s, a spot diameter of 3 mm, an argon flow rate of 25 L/min, and a powder feed rate of 8 g/min. The laser-heat-cured coating was obtained on the outer surface of the pan body through natural cooling for 15 s. Then, the surface of the laser-heat-cured coating was purged with an argon gas under a pressure of 1-2 MPa to be clean, and was then subjected to extreme high-speed laser remelting, to obtain the superconducting magnetic layer. The process parameters of the extreme high-speed laser remelting include power of 200 W, a scanning speed of 8 mm/s, a spot diameter of 4 mm, and an argon flow rate of 20 L/min.

In another implementation, the overall process for preparing the laser titanium kitchenware includes: 1: stretch forming on round sheet, 2: edge turning, 3: washing, 4: sandblasting, 5: performing steps S2 to S4 according to the implementation processes and parameters, 6: internal polishing, 7: external sanding, 8: extreme high-speed laser cladding and curing on superconducting magnetic layer according to the implementation process and implementation parameters in step S5, 9: sanding, 10: curing, 11: assembly, and 12: packaging.

Comparative Example 1: The difference from Example 1 lies in that the non-stick coating is the nanoscale metal ceramic layer formed by extreme high-speed laser cladding and curing, without the new nano-ceramic material. During preparing, due to high hardness and poor toughness of the nanoscale metal ceramic layer, the obtained kitchenware cracks when the pan bottom is shaped, which does not satisfy a product quality requirement.

Comparative Example 2: The difference from Example 1 lies in that the non-stick coating is the new nano-ceramic material formed by curing, without the nanoscale metal ceramic layer.

Comparative Example 3: The difference from Example 1 lies in that the nanoscale metal ceramic layer includes 10% of titanium-coated particles and 90% of new nanocomposite ceramic powder material.

Comparative Example 4: The difference from Example 1 lies in that the nanoscale metal ceramic layer includes 60% of titanium-coated particles and 40% of new nanocomposite ceramic powder material.

Comparative Example 5: The difference from Example 1 lies in that in the nanoscale metal ceramic layer, the titanium-coated particles are replaced with nanoscale titanium powder, resin, and silicone oil in the same proportion.

Comparative Example 6: The difference from Example 1 lies in that a thickness of the non-stick coating is 300 μm. The nanoscale metal ceramic layer of a thickness of 25 μm and the new nano-ceramic material of a thickness of 5 μm are alternately stacked for 20 times.

Comparative Example 7: The difference from Example 1 lies in that the pan body includes no superconducting magnetic layer, and the preparation method includes no step S5.

Performance Tests

The kitchenware provided in Example 1 and Comparative Examples 1 to 7 was separately subjected to performance tests. Test results are shown in Table 1 below.

The test method of wear resistance is rubbing the kitchenware with a 3M-7447 scouring pad back and forth to apply 3 kg static vertical stress, where rubbing back and forth once is one cycle, changing the scouring pad every 1000 cycles, and recording a quantity of cycles.

The test method of high-temperature resistance is as follows. The kitchenware is put in a constant-temperature test chamber at 350±5° C. for 0.5 h, and then the kitchenware is taken out for natural cooling to room temperature. After this, if the coating of the kitchenware has no abnormalities such as discoloration, blistering, melting, falling off, and cracking, it is determined that the kitchenware is tolerant of this temperature. Then, the temperature of the constant-temperature test chamber is gradually increased by a gradient of 50° C. to determine a maximum tolerant temperature of the kitchenware.

The test method of good persistence of non-stick performance is heating the pan body to 140-150° C., breaking an egg into the pan body, heating the pan body to 190-240° C., flipping the egg with a plastic spatula after the egg white is substantially solid, and recording a maximum quantity of fried eggs made in the pan body until the pan body becomes stick.

The test method of hardness is measuring the hardness according to GB/T 40737-2021. According to the enterprise standard, 500 HV is used as the qualified standard for the hardness of laser titanium.

The test method of thermal efficiency is turning on an intelligent program-controlled variable-frequency power supply instrument, setting a voltage to 220 V, pressing a start switch, pressing a power supply switch of a display screen, adding 500 ml of water at room temperature in the sample, turning on an induction cooker and switching to maximum power for heating until the water boils, recording boiling power and time, and calculating the thermal efficiency.

The test methods and standards of the degree of coating adhesion, thermal shock stability, alkali resistance, acid resistance, and salted water resistance are performed according to the test items and test methods in the Chinese national standard GB/T 2421-1998.

TABLE 1

| Test item | Example 1 | Comparative Example 2 | Comparative Example 3 | Comparative Example 4 | Comparative Example 5 | Comparative Example 6 | Comparative Example 7 |
|---|---|---|---|---|---|---|---|
| Wear resistance (10000 cycles) | 52 | 27 | 35 | 23 | 27 | 31 | 51 |
| High-temperature resistance (° C.) | 550 | 400 | 450 | 500 | 350 | <350 | 550 |
| Hardness (HV) | 1250 | 839 | 941 | 1028 | 837 | 710 | 1038 |
| Persistence of non-stick performance | 2860 | 1603 | 1420 | 1230 | 570 | 630 | 2740 |
| Thermal efficiency % | 94.7 | 92.1 | 93.5 | 90.2 | 89.1 | 64.7 | 54.8 |
| Degree of coating adhesion | No falling off in a whole grid | No falling off in a whole grid | No falling off in a whole grid | Falling off | No falling off in a whole grid | No falling off in a whole grid | No falling off in a whole grid |
| Thermal shock stability | No blistering or cracking | No blistering or cracking | No blistering or cracking | No blistering or cracking | No blistering or cracking | Cracking | No blistering or cracking |
| Alkali resistance | No blistering or cracking or shrinkage cavities | No blistering or cracking or shrinkage cavities | No blistering or cracking or shrinkage cavities | No blistering or cracking or shrinkage cavities | No blistering or cracking or shrinkage cavities | No blistering or cracking or shrinkage cavities | No blistering or cracking or shrinkage cavities |
| Acid resistance | No blistering or cracking or shrinkage cavities | No blistering or cracking or shrinkage cavities | No blistering or cracking or shrinkage cavities | No blistering or cracking or shrinkage cavities | No blistering or cracking or shrinkage cavities | No blistering or cracking or shrinkage cavities | No blistering or cracking or shrinkage cavities |
| Salted water resistance | No defects such as blistering and corrosion pits | No defects such as blistering and corrosion pits | No defects such as blistering and corrosion pits | No defects such as blistering and corrosion pits | No defects such as blistering and corrosion pits | No defects such as blistering and corrosion pits | No defects such as blistering and corrosion pits |

It can be learned from the results in Table 1 that the laser titanium kitchenware according to Example 1 of the present invention has good hardness and wear resistance, is tolerant of 550° C., and has good persistence of non-stick performance. This is because the nanoscale metal ceramic layer and the new nano-ceramic material are alternately stacked. In this case, an effect of high hardness, good wear resistance, and good persistence of non-stick performance of the non-stick coating can be achieved. The kitchenware in Comparative Example 2, including only the new nano-ceramic material, has certain non-stickiness, but has poor wear resistance and poor persistence of non-stick performance. In the kitchenware in Comparative Example 3, the content of the titanium-coated particles in the nanoscale metal ceramic layer is low, which affects the hardness and persistence of non-stick performance of the coating. In the kitchenware in Comparative Example 4, the content of the titanium-coated particles in the nanoscale metal ceramic layer is high. As the titanium-coated particles contain resin and silicone oil, the bonding between the new nano-ceramic material and the nanoscale metal ceramic layer is weak, which affects the hardness and persistence of non-stick performance of the non-stick coating. In addition, the adhesion of the coating is poor, and consequently wear resistance becomes poor. In Comparative Example 5, the titanium-coated particles are replaced with nanoscale titanium powder, resin, and silicone oil in the same proportion. During extreme high-speed laser cladding and curing, the resin and silicone oil evaporate at high temperature, so the obtained nanoscale metal ceramic layer loses the non-stick effect. Consequently, after the surface layer, that is, the new nano-ceramic material, of the non-stick coating is worn out, the kitchenware loses the non-stick effect. In Comparative Example 6, the thickness of the nanoscale metal ceramic layer is 25 μm. When the kitchenware is shaped, microcracks are formed on the nanoscale metal ceramic layer. The microcracks will increase at high temperature even if covered by the new nano-ceramic material. It can be learned from the data in Comparative Example 7 that the superconducting magnetic layer has high magnetic conductivity, which can significantly improve the thermal efficiency of the kitchenware.

In the foregoing examples, descriptions of the example have respective focuses. For a part that is not described in detail in an example, refer to related descriptions in other examples.

The foregoing descriptions are merely specific implementations of the present invention, but are not intended to limit the protection scope of the present invention. Any equivalent modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A preparation method of laser titanium kitchenware, wherein the laser titanium kitchenware comprises a pan body and a non-stick coating provided on an inner surface of the pan body, wherein the non-stick coating is a nanoscale metal ceramic layer formed by extreme high-speed laser cladding and curing; or the non-stick coating is obtained by stacking a nanoscale metal ceramic layer formed by extreme high-speed laser cladding and curing and a new nano-ceramic material formed by curing; or the non-stick coating is obtained by alternately stacking a nanoscale metal ceramic layer formed by extreme high-speed laser cladding and curing and a new nano-ceramic material formed by curing for a plurality of times;

the nanoscale metal ceramic layer comprises 15-45% of titanium-coated particles and 55-85% of new nanocomposite ceramic powder material in percentage by mass;

the new nano-ceramic material comprises 20-30% of polymethylsiloxane, 0.5-20% of hydroxyl silicone oil, 1-5% of low-melting-point glass powder, 6-10% of silica sol, 5-10% of silicon nitride, 5-10% of nanoscale titanium dioxide, 8-12% of nanoscale aluminum oxide, 6-8% of nanoscale titanium, 3-6% of wetting and dispersing additive, 2-4% of thickener, and 10-15% of water in percentage by mass;

the new nanocomposite ceramic powder material is at least one of titanium nitride, titanium carbide, silicon carbide, titanium carbonitride, titanium boride, aluminum oxide, lanthanum oxide, yttrium oxide, zirconium oxide, magnesium oxide, hydroxyapatite, and iron powder; and the titanium-coated particle is of a core-shell structure with three layers, an outer shell layer is a titanium metal, an inner core layer is silicone oil, a resin layer is between the outer shell layer and the inner core layer, and the resin layer is a mixture of polymethylsiloxane and iron powder, wherein in percentage by mass, the titanium metal is 10-40%, polymethylsiloxane is 55-70%, the iron powder is 0.5-2%, and the balance is the silicone oil;

wherein the preparation method comprises the following steps:

sandblasting a clean pan body; and preparing a non-stick coating on an inner surface of the pan body, wherein a method for preparing the non-stick coating comprises: heating the pan body to 120-180° C., performing extreme high-speed laser cladding and curing on a powder material of the nanoscale metal ceramic layer to obtain the nanoscale metal ceramic layer of a preset thickness, and performing high-temperature melting and curing at 293-1693° C. to obtain the non-stick coating; or a method for preparing the non-stick coating comprises: heating the pan body to 120-180° C., performing extreme high-speed laser cladding and curing on a powder material of the nanoscale metal ceramic layer to obtain the nanoscale metal ceramic layer, curing a coating of the new nano-ceramic material on the nanoscale metal ceramic layer to obtain the new nano-ceramic material, and performing high-temperature melting and curing at 293-1693° C. to obtain the non-stick coating of a preset thickness; or a method for preparing the non-stick coating comprises: S2: heating the pan body to 120-180° C., and performing extreme high-speed laser cladding and curing on a powder material of the nanoscale metal ceramic layer to obtain the nanoscale metal ceramic layer; S3: curing a coating of the new nano-ceramic material on the nanoscale metal ceramic layer to obtain the new nano-ceramic material; and repeating steps S2 and S3 until a preset thickness is obtained, and performing high-temperature melting and curing at 293-1693° C. to obtain the non-stick coating.

2. The preparation method according to claim 1, further comprising: performing extreme high-speed laser cladding and curing on a superconducting magnetic layer on an outer surface of the pan body.

3. The preparation method according to claim 1, wherein a particle size of the new nanocomposite ceramic powder material is 0.01-6 μm, and a particle size of the titanium-coated particle is 2-6 μm.

4. The preparation method according to claim 1, wherein a thickness of the non-stick coating is 30-1000 μm.

5. The preparation method according to claim 1, wherein a thickness of the nanoscale metal ceramic layer is 5-20 μm.

6. The preparation method according to claim 1, wherein a thickness of the new nano-ceramic material is 1-8 μm.

7. The preparation method according to claim 1, wherein a superconducting magnetic layer of a thickness of 300-600 μm is provided on an outer surface of the pan body.

8. The preparation method according to claim 7, wherein the superconducting magnetic layer comprises the following components in percentage by mass:

80-92% of nickel-iron alloy, 0.03-2.5% of carbon powder, 2-6% of graphene, 1-3.5% of chromium powder, 4-6% of molybdenum powder, and 0.5-3% of copper powder, wherein the nickel-iron alloy contains 65-79% of nickel.

9. The preparation method according to claim 1, wherein the pan body is made of any one of aluminum, iron, stainless steel, copper, titanium, and ceramic.

* * * * *